(No Model.)
F. E. D. FIELD.
LOOM TEMPLE.
No. 510,851.  Patented Dec. 12, 1893.
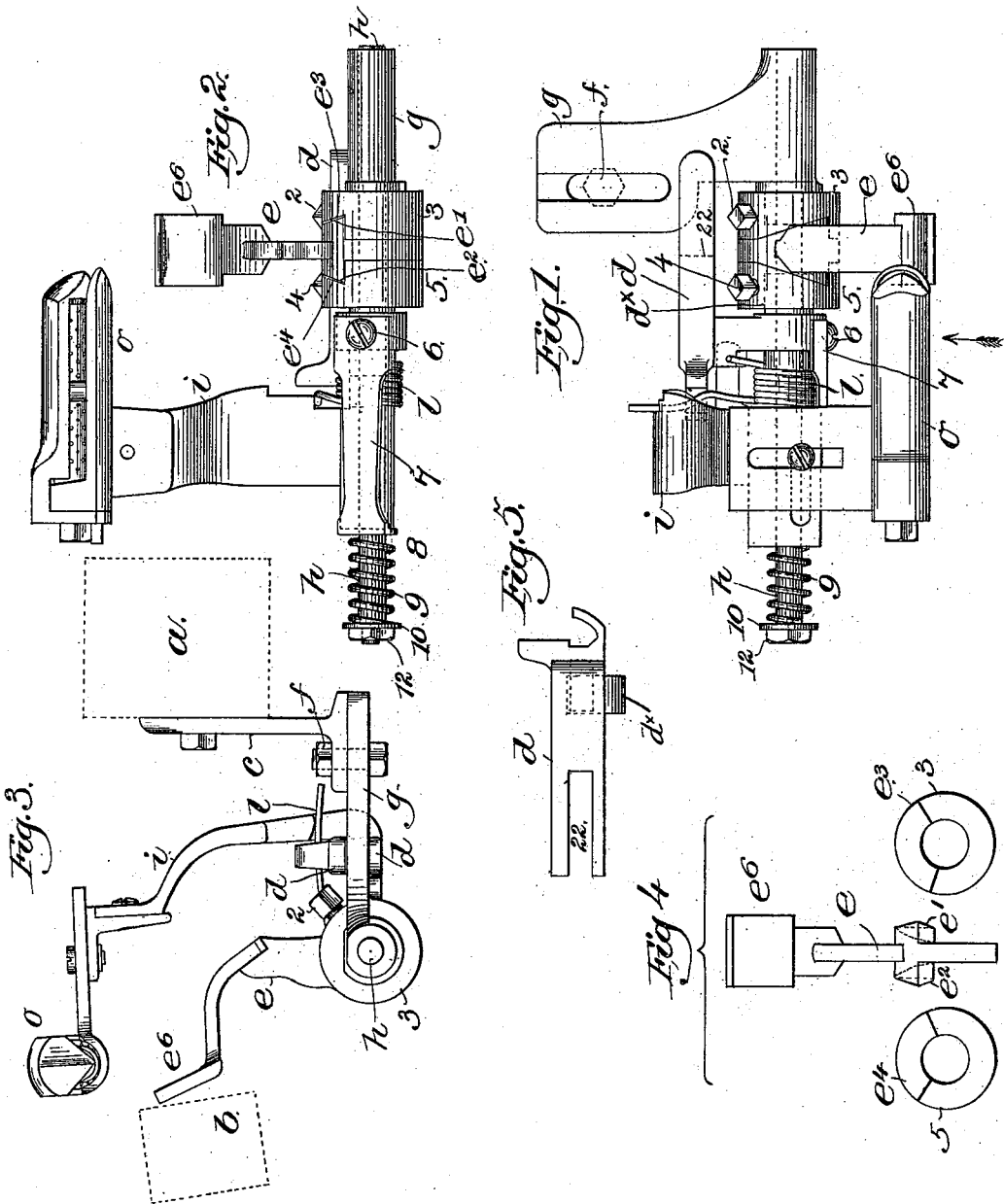
Witnesses.
Edward F. Allen
Louis N. Gowell
Inventor:
Frank E. D. Field.
by Crosby & Gregory attys.

UNITED STATES PATENT OFFICE.

FRANK E. D. FIELD, OF NEW MARKET, NEW HAMPSHIRE, ASSIGNOR TO THE DUTCHER TEMPLE COMPANY, OF HOPEDALE, MASSACHUSETTS.

LOOM-TEMPLE.

SPECIFICATION forming part of Letters Patent No. 510,851, dated December 12, 1893.

Application filed September 22, 1891. Serial No. 406,477. (No model.)

*To all whom it may concern:*

Be it known that I, FRANK E. D. FIELD, of New Market, county of Rockingham, State of New Hampshire, have invented an Improvement in Loom-Temples, of which the following description, in connection with the accompanying drawings, is a specification, like letters and numerals on the drawings representing like parts.

This invention has for its object to improve the construction of loom temples, whereby the temple head may have imparted to it a lateral movement at right angles to the warp or widthwise of the loom at each beat of the lay toward the fell, the temple head deriving this lateral movement by or through a vibrator having preferably a cam surface, the lateral movement of the temple head and its carrier taking place before or about as the lay acts to push the temple head toward the breast beam in usual manner.

Figure 1 is a plan view of a loom temple embodying my invention; Fig. 2, an elevation thereof looking from the arrow in Fig. 1; Fig. 3, a side elevation. Fig. 4 shows the vibrator and cam collars detached, and Fig. 5 shows the yoke detached.

I have chosen to illustrate my invention as applied to the class of temple illustrated in United States Patent No. 177,227.

The dotted lines $a$ represent the breast beam, the dotted lines $b$ the lay.

$c$ is a stand bolted in usual manner to the inner side of the breast beam.

$g$ is a pivot-carrying plate attached to the foot of the stand by a bolt $f$.

$h$ is a pivot carried by the pivot-plate.

$o$ is a temple head consisting in practice of a pod, a cap, and a roll of any usual construction.

$i$ is a temple head-carrier having a hub at its lower end to embrace the pivot $h$; and $l$ is a spring surrounding the pivot $h$ and normally acting to keep the temple head pressed toward the lay.

The parts so far described are substantially the same as in the patent referred to wherein like letters are used to designate like parts, with the exception that the pivot $h$ is longer than in the patent referred to, for it is contemplated that the hub of the temple head-carrier shall slide longitudinally on the pivot $h$ and also rock the said pivot.

Upon the pivot $h$ next to the foot-plate, I have, in this present instance of my invention, attached by a screw 2, a cam-faced collar 3.

Loosely surrounding the pivot $h$ between the foot piece and the hub, is a yoke $d$, shown detached in Fig. 5, said yoke being represented as bifurcated or forked at 22 to embrace and be guided by a part of the foot piece. This yoke has a sleeve-like hub $d^x$, see dotted lines Fig. 1, upon which is adjustably attached by means of a screw 4 a cam-faced collar 5, and the hub has also connected to it by a screw 6 a finger 7, which has an ear 8 to embrace and slide upon the pivot $h$, the said ear overlapping one end of the hub of the carrier and being acted upon by a spring 9 surrounding the pivot $h$, the outer end of the spring being acted upon in turn by a washer 10, held in place by a nut 12, the said spring normally acting to push the temple-carrier and yoke toward the longitudinal center of the loom.

I have mounted loosely upon the pivot $h$, between the cam-faced collars, a vibrator $e$, herein represented as a finger having a hub provided with cam surfaces $e'$, $e^2$ to co-operate with the cam surfaces $e^3$, $e^4$, respectively of the cam-faced collars, the upper end of the vibrator having an ear $e^6$, so located in the present instance of my invention as to be struck by the lay as it comes forward toward the breast beam just before the said lay strikes the usual heel of the carrier. The cam-faced collars may be adjusted about the pivot pin so as to place the upper end of the vibrator normally at a greater or less distance from the inner side of the breast beam, so that the lay as it comes forward will strike the vibrator sooner or later and in turning it cause its cam surfaces acting on the cam surfaces of the collars, to push the yoke and the temple head-carrier laterally or widthwise of the loom before the lay strikes the heel of the temple bar-carrier to push it in unison with it toward the breast beam. By the adjustment of the cam-faced collars in the direction stated, a greater or less portion of the cam surfaces referred to are made effective during the forward beat of the lay, so as to stretch widthwise the fabric being woven to a greater or less extent according to the character of the fabric.

The shape of the cam surfaces may be varied as may be desired, according to the loom to which the improved temple is to be applied.

This invention is not limited to the peculiar or particular shape of the vibrator, or of the yoke, or of the means employed between the movable cam-faced collar and the hub of the temple-carrier to move the temple carrier laterally.

Having described my invention, what I claim, and desire to secure by Letters Patent, is—

1. The pivot, and temple head-carrier mounted thereon, combined with a vibrator having a cam-faced hub mounted on said pivot and a movable yoke connecting with the temple-head carrier and actuated by said hub to move the said temple head-carrier laterally during each forward beat of the lay, substantially as described.

2. In a loom temple, a pivot; a temple head-carrier mounted thereon; a spring to normally keep the upper end of the temple head-carrier pressed toward the breast beam; a spring to normally act upon and move the temple head-carrier longitudinally upon the pivot; and a vibrator, and cams to move the temple head-carrier in opposition to the spring, substantially as described.

3. In a loom temple, a foot-plate; the pivot mounted thereon, and an attached cam; and a yoke and an attached cam mounted loosely upon said pivot and adapted to slide horizontally thereon, combined with a temple head-carrier mounted to turn upon the said pivot and also to slide thereon, substantially as described.

4. In a loom temple, a temple head-carrier, a pivot upon which it is loosely mounted, a foot-plate to hold the pivot, and a vibrator having a cam surface, combined with cam-collars, one or both of which may be adjusted to determine the extent of lateral throw of the temple head-carrier, substantially as described.

5. In a loom temple, a temple head-carrier; and means to support it in its movements, combined with a vibrator, and an adjustable cam surface co-operating therewith, the said vibrator being adapted to be actuated by the lay prior to the action of the lay upon the usual temple carrier, whereby the temple carrier is moved laterally or widthwise of the loom during each beat of the lay toward the breast beam, substantially as described.

In testimony whereof I have signed my name to this specification in the presence of two subscribing witnesses.

FRANK E. D. FIELD.

Witnesses:
GEO. W. GREGORY,
FRANCES M. NOBLE.